United States Patent [19]
Perez et al.

[11] 4,352,192
[45] Sep. 28, 1982

[54] TIMING SIGNAL SYNCHRONIZATION DEVICE

[75] Inventors: André Perez; Jean M. Boljevic; Alain Dautremay, all of Paris, France

[73] Assignee: Thomson-CSF, Paris, France

[21] Appl. No.: 154,305

[22] Filed: May 29, 1980

[30] Foreign Application Priority Data

Jun. 1, 1979 [FR] France ................................ 79 14181

[51] Int. Cl.³ ............................................. H04L 7/06
[52] U.S. Cl. ...................................... 375/56; 375/84; 329/104
[58] Field of Search ..................... 375/56, 82, 84, 96, 375/110, 119; 329/50, 104, 110

[56] References Cited

U.S. PATENT DOCUMENTS

| | | | |
|---|---|---|---|
| 3,599,103 | 8/1971 | Nussbaumer | 328/135 |
| 3,727,145 | 4/1973 | Huntstinger | 375/82 |
| 3,778,727 | 12/1973 | Williams | 375/82 |
| 3,818,346 | 7/1974 | Fletcher | 375/85 |
| 3,843,931 | 10/1974 | Sarkilahti | 329/104 |
| 4,010,323 | 3/1977 | Peck | 375/119 |

*Primary Examiner*—Benedict V. Safourek
*Assistant Examiner*—Stephen Chin
*Attorney, Agent, or Firm*—Oblon, Fisher, Spivak, McClelland & Maier

[57] ABSTRACT

A device for the synchronization of a local timing signal to permit the demodulation of a differential phase-modulated carrier in synchronous data transmission systems. On the basis of a limited signal of the modulated carrier and a timing signal whose frequency is equal to quadruple that of the carrier, a logic element circuit comprising EXCLUSIVE-OR gates and synchronized flip-flops carries out a sequence of correlations and supplies pulses representative of the position of the phase jumps. These pulses are only used for the phase and frequency of the local timing signal.

3 Claims, 2 Drawing Figures

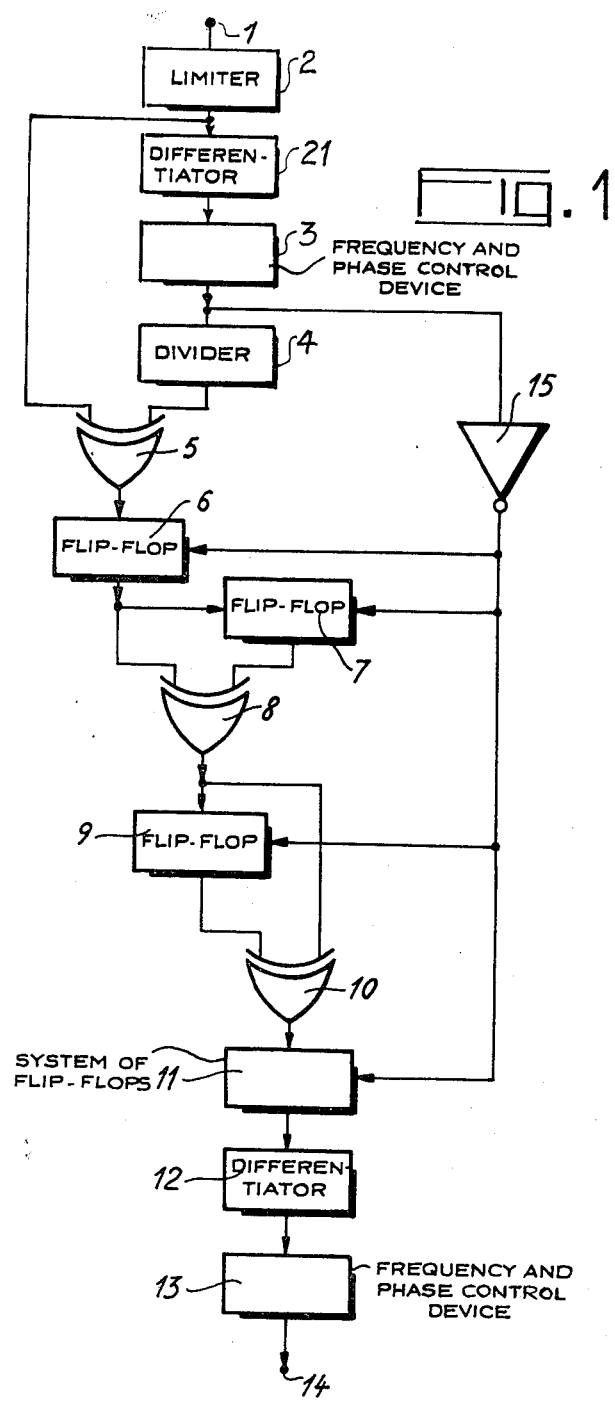

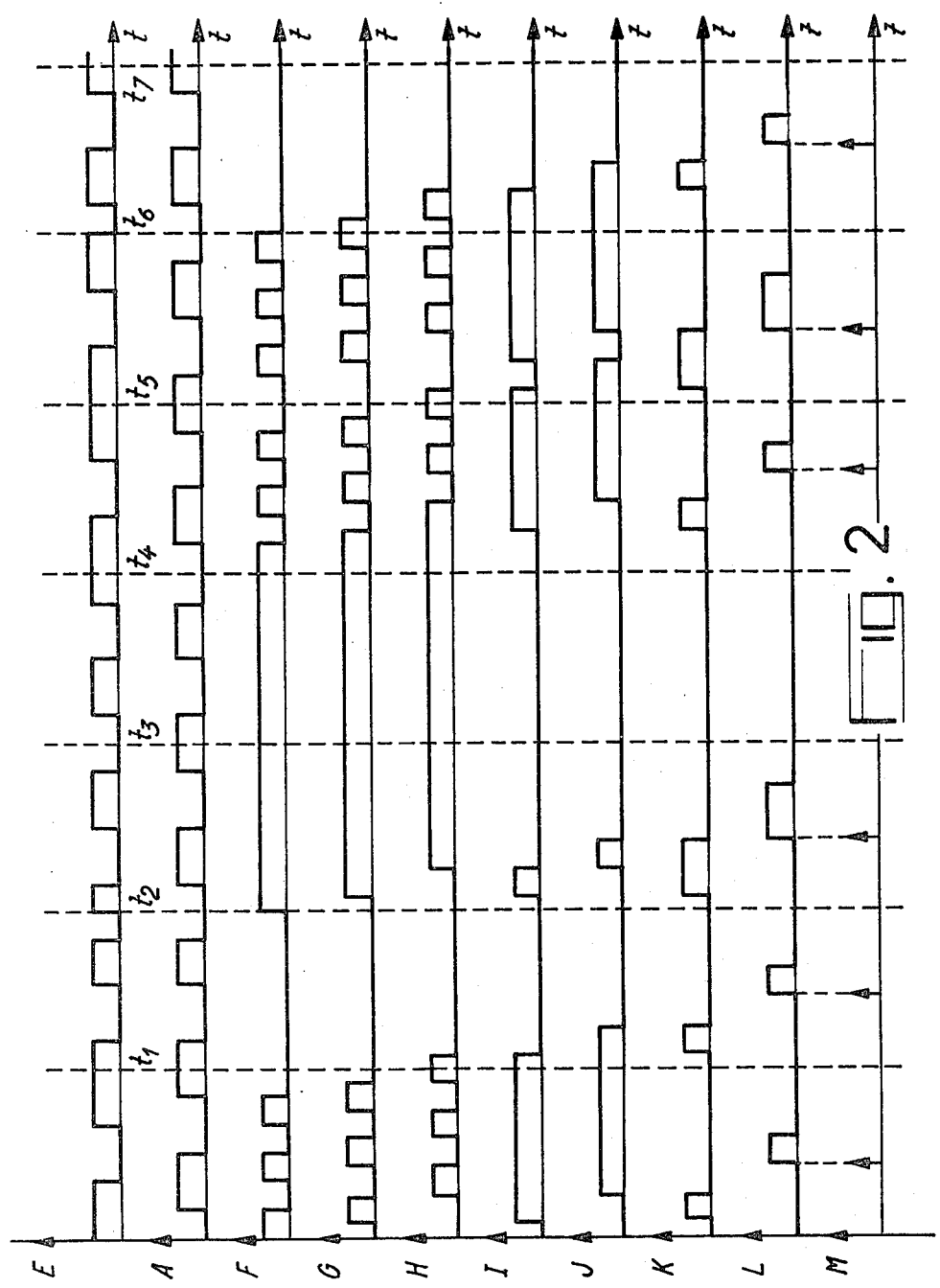

4,352,192

TIMING SIGNAL SYNCHRONIZATION DEVICE

BACKGROUND OF THE INVENTION

The present invention relates to timing signal synchronization devices and in particular to those equipping differential phase demodulators used in synchronous data transmission systems.

These demodulators make it necessary to restore at reception a local timing signal which is dependent in frequency and phase on a transmitting signal, whose frequency is the same as that at which the data were transmitted by means of a phase-modulated carrier.

It is known to construct narrow cut filters making it possible to extract from the modulated carrier a local timing signal, whose frequency and phase are the same as in the transmission timing signal. However, it is costly to carry out narrow band digital or analog filtering processes.

BRIEF SUMMARY OF THE INVENTION

The object of the invention is to obviate this disadvantage by using simple means.

The present invention therefore relates to a device for synchronizing a local timing signal with respect to a first timing signal, whose frequency $F_1$ is the same as that at which groups of two data bits were transmitted by means of a differential phase-modulated frequency carrier F, $F_1$ being equal to (2F/3), comprising a carrier wave limiter having an output for supplying a first signal, a differentiating circuit having an input coupled to the output of the limiter and an output, a first frequency and phase control device for supplying a second timing signal whose frequency is equal to quadrauple the carrier frequency F having an input coupled to the output of the differentiating circuit and an output, a frequency divider by four having an input coupled to the output of the first frequency and phase control device and an output for supplying a second signal, a device for detecting the phase change position of the carrier wave performing a correlation sequence from the first signal and the second signal having a first and a second input coupled respectively to the output of the divider and to the output of the limiter and an output for supplying pulses representative of the position of the phase jumps, and a second frequency and phase control device having an input coupled to the output of the detection device and an output for supplying a local controlled timing signal.

BRIEF DESCRIPTION OF THE DRAWINGS

The invention is described in greater detail hereinafter relative to non-limitative embodiments and the attached drawings, wherein show:

FIG. 1 a diagram of an embodiment of a synchronization device according to the invention.

FIG. 2 voltage-time diagrams of signals providing an explanation of the operation of the device of FIG. 1.

DETAILED DESCRIPTION OF THE PREFERRED EMBODIMENTS

In FIG. 1, a terminal 1, for receiving a phase-modulated carrier is applied to a limiter 2, whose output is coupled to a differentiator 21 which carries out the differentiation of the rising and falling fronts of the signal supplied by the limiter 2. The output of the differentiator 21 is coupled to a frequency and phase control device 3.

The output of control device 3 is coupled to the input of a divider 4, whose output is coupled to a first input of an EXCLUSIVE-OR gate 5, whose second input is connected to the output of limiter 2. The output of this EXCLUSIVE-OR gate 5 is connected to the input of a first synchronized flip-flop 6. The output of this first flip-flop is connected to a first input of a second EXCLUSIVE-OR gate 8, whose second input is coupled to the output of a second synchronized flip-flop 7 whose input is coupled to the output of the first flip-flop 6. The output of the second EXCLUSIVE-OR gate 8 is connected to a first input of a third EXCLUSIVE-OR gate 10, whose second input is coupled to the output a third synchronized flip-flop 9 whose input is connected to the output of the second EXCLUSIVE-OR gate 8. The output of the third and final EXCLUSIVE-OR gate 10 is coupled to the input of a system of synchronized flip-flops 11 followed by a differentiator 12 acting on the rising fronts of the signal from system 11. The output of the differentiator 12 is connected to the input of a frequency and phase control device 13. The output of device 13 is connected to an output terminal 14. Each of the synchronized flip-flops 6, 7, 9 and 11 has a timing signal input coupled to the output of device 3 across a complementary gate 15 whose input is coupled to the output of the control device 3.

The presently described embodiment relates to a differential phase demodulator at 2400 bits/second. In this type of modulation, the frequency of the carrier is equal to 1800 Hz. The differential phase modulation consists of applying to the said carrier, at each signalling moment, a phase jump of 0°, 90°, 180° or 270°, each phase jump corresponding to a group of two data bits. The frequency of the phase jumps is equal to 1200 Hz.

The frequency and phase control devices 3 and 13 are of conventional types. Their principle is based on deriving the timing frequency from an oscillator which supplies a frequency q times higher than the timing frequency desired at the output of the device and of applying it to a variable rank divider. The division rank can be controlled in order to vary the frequency and consequently the phase of the timing frequency supplied. The division rank is chosen by a phase comparator which, in accordance with the position of the transitions of the signal applied to the input of the device compared with the timing signal supplied, controls the value of the division rank in order to bring the rising front of the timing signal supplied closer to the signal transitions. Thus, devices 3 and 13 supply a timing signal which is controlled by the signal transitions applied to their input.

The operation of this device will be better understood from the voltage-timing diagrams described hereinafter.

FIG. 2 shows signals E, A, F, G, H, I, J, K, L and M respectively present at the output of limiter 2, the output of divider 4, the output of EXCLUSIVE-OR gate 5, the output of the first flip-flop 6, the output of the second flip-flop 7, the input of the third flip-flop 9, the output of the third flip-flop 9, the input of the system of flip-flops 11, the output of said same system and at the output of differentiator 12.

Signal E of FIG. 2 represents the modulated and limited data signal. The phase variations applied at signalling moments $t_1$ to $t_7$ are respectively: +270°, +180°, 0°, 270°, 180°, 90° and 0°. The rising and falling fronts of signal E are spaced from one another by a whole number of periods of a frequency $F_2$ equal to quadruple the carrier frequency ($F_2 = 7200$ Hz). After differentiation of the rising and falling fronts by differentiator 21 signal E is applied to the frequency and phase control device 3, which supplies a controlled timing signal, whose frequency is 7200 Hz. The frequency of this timing signal is divided by four by divider 4 in order to obtain signal A, whose frequency is the same as the carrier and whose phase is defined to within $k(\pi/2)$ (k = positive integer). The timing signal obtained at the output of device 3 is also used after inversion to control the synchronized flip-flops 6, 7, 9 and 11. Signal F is obtained at the output of gate 5, which performs an EXCLUSIVE-OR function between signals A and E. Signals G and H respectively represent signal F delayed by a time lag $T_1$ equal to one half-cycle of the timing signal at 7200 Hz ($T_1 = 1/8F$) and signal G delayed by a time lag $T_2$ equal to one cycle of the timing signal at 7200 Hz ($T_2 = 1/4F$). These time lags are respectively obtained by means of flip-flops 6 and 7. In the same way, the second gate 8 performs an EXCLUSIVE-OR function between signals H and G and supplies signal I. The third gate 10 performs an EXCLUSIVE-OR function between signal I and signal J, which represents signal I delayed by a time lag $T_3$ equal to one cycle of the timing signal at 7200 Hz ($T_3 = 1/4F$), this time lag being obtained by means of flip-flop 9. Signal K resulting from the latter correlation is supplied to the system of flip-flops 11 which introduces a time lag, equal to two cycles of the timing cycle at 7200 Hz, in order to obtain signal L, whose front is centered between the signalling times. This signal L, which is applied after differentiation to the frequency and phase control device 13 makes it possible to obtain a local timing signal at a frequency $F_1$ equal to 1200 Hz, which is controlled. Thus, the pulses obtained after differentiation are either at $1/12F_1$ or at $3/12F_1$ from the centre of the interval between two signalling times. This makes it possible to obtain a local timing signal synchronized with a mean position between $1/12F_1$ and $3/12F_1$ from the centre of the signalling interval.

The invention is not limited to the embodiments described and represented hereinbefore and in particular the time lags introduced by flip-flops 6, 7, 9 and 11 can be obtained by any other time lag device and can be modified in the case of another application.

It should be noted that signal K is independent of the phase of signal A relative to signal E.

What is claimed is:

1. A device for synchronizing a local timing signal with respect to a first timing signal, whose frequency $F_1$ is the same as that at which groups of two data bits are transmitted by means of a differential phase-modulated frequency carrier F, $F_1$ being equal to (2F/3), comprising a carrier wave limiter having an output for supplying a first signal, a differentiating circuit having an input coupled to the output of the limiter and an output, a first frequency and phase control device for supplying a second timing signal whose frequency is equal to quadruple the carrier frequency F having an input coupled to the output of the differentiating circuit and an output, a frequency divider by four having an input coupled to the output of the first frequency and phase control device and an output for supplying a second signal, a device for detecting the phase change position of the carrier wave performing a correlation sequence from the first signal and the second signal having a first and a second input coupled respectively to the output of the divider and to the output of the limiter and an output for supplying pulses representative of the position of the phase jumps, and a second frequency and phase control device having an input coupled to the output of the detection device and an output for supplying a local controlled timing signal.

2. A synchronization device according to claim 1, wherein the detection device for the position of the phase changes incorporates a first EXCLUSIVE-OR gate having a first and a second input respectively coupled to the output of the divider and the output of the limiter and an output, a first delay device with a time lage $T_1 = 1/8F$, having an input coupled to the output of the first EXCLUSIVE-OR gate and an output, a second delay device with a time lag $T_2 = 1/4F$ having an input coupled to the output of the first delay device and an output, a second EXCLUSIVE-OR gate having a first input coupled to the output of the first delay device, a second input coupled to the output of the second delay device, a third delay device with a time lag $T_3 = 1/4F$ having an input coupled to the output of the second EXCLUSIVE-OR gate and an output, a third EXCLUSIVE-OR gate having a first and a second input coupled respectively to the output of the second EXCLUSIVE-OR gate and the output of the third delay device and having an output, a fourth delay device with a time lag $T_4 = K1/4F$ (K equals a positive integer) having an input coupled to the output of a third EXCLUSIVE-OR gate and an output and a differentiator having an input coupled to the output of the fourth delay device and an output coupled to the input of the second control device.

3. A synchronization device according to claim 2, wherein the detection device comprises an inverter and wherein the delay devices are synchronized flip-flops having a timing signal input coupled to the output of an inverter whose input is coupled to the output of the fast control device.

* * * * *